(12) United States Patent
Aramaki et al.

(10) Patent No.: US 12,514,585 B2
(45) Date of Patent: Jan. 6, 2026

(54) ADHESION PROMOTION DEVICE

(71) Applicant: TERUMO KABUSHIKI KAISHA, Tokyo (JP)

(72) Inventors: Naoki Aramaki, Kanagawa (JP); Miho Kai, Kanagawa (JP); Miria Suzuki, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 703 days.

(21) Appl. No.: 17/481,396

(22) Filed: Sep. 22, 2021

(65) Prior Publication Data

US 2022/0000483 A1   Jan. 6, 2022

Related U.S. Application Data

(63) Continuation of application No. PCT/JP2020/014269, filed on Mar. 27, 2020.

(30) Foreign Application Priority Data

Mar. 28, 2019   (JP) .................................. 2019-064719

(51) Int. Cl.
*A61B 17/11*   (2006.01)
*A61B 17/00*   (2006.01)

(52) U.S. Cl.
CPC ...... *A61B 17/1114* (2013.01); *A61B 17/0057* (2013.01); *A61B 2017/00597* (2013.01);
(Continued)

(58) Field of Classification Search
CPC ............ A61B 17/1114; A61B 17/0057; A61B 2017/00597; A61B 2017/0061; A61B 2017/0065
See application file for complete search history.

(56) References Cited

U.S. PATENT DOCUMENTS 7,128,748 B2 * 10/2006 Mooradian .......... A61B 17/115
                                                606/151
8,236,015 B2 *  8/2012 Bettuchi ............ A61B 17/1155
                                                227/175.1
(Continued)

FOREIGN PATENT DOCUMENTS

DE   10 2015 205 056 A1   9/2016
EP    1 825 820 A1   8/2007
(Continued)

OTHER PUBLICATIONS

English Translations of the International Search Report (Form PCT/ISA/210) and the Written Opinion of the International Searching Authority (Form PCT/ISA/237) issued Jun. 16, 2020, by the Japanese Patent Office in corresponding International Application No. PCT/JP2020/014269. (8 pages).
(Continued)

*Primary Examiner* — Sarah A Long
*Assistant Examiner* — James R Mcginnity
(74) *Attorney, Agent, or Firm* — Buchanan Ingersoll & Rooney PC

(57) ABSTRACT

An adhesion promotion device is disclosed, which is capable of reducing risk factors of an anastomotic leakage after surgery. The adhesion promotion device includes a sheet-shaped first region disposed between one joint target site and the other joint target site of biological organs to promote adhesion of a biological tissue, a second region provided inward of the first region and separated from the first region in a direction intersecting with a surface direction of the first region, and an interlock portion that interlocks the first region and the second region with each other.

18 Claims, 5 Drawing Sheets

(52) U.S. Cl.
CPC ............... *A61B 2017/0061* (2013.01); *A61B 2017/0065* (2013.01)

(56) References Cited

U.S. PATENT DOCUMENTS

| | | | |
|---|---|---|---|
| 8,646,674 B2* | 2/2014 | Schulte | A61B 17/00491 623/23.72 |
| 2003/0183671 A1* | 10/2003 | Mooradian | A61B 17/115 227/175.1 |
| 2005/0059996 A1 | 3/2005 | Bauman et al. | |
| 2006/0085034 A1* | 4/2006 | Bettuchi | A61B 17/1155 227/19 |
| 2009/0105734 A1 | 4/2009 | Gronberg et al. | |
| 2012/0241505 A1 | 9/2012 | Alexander, III et al. | |
| 2013/0304100 A1* | 11/2013 | Gronberg | A61B 17/1114 606/153 |
| 2015/0012036 A1* | 1/2015 | Ozer | A61B 17/0057 606/213 |
| 2016/0375064 A1* | 12/2016 | Beaudry | A61Q 19/08 424/489 |
| 2018/0214201 A1 | 8/2018 | Bargon et al. | |
| 2019/0083087 A1 | 3/2019 | Viola et al. | |

FOREIGN PATENT DOCUMENTS

| | | |
|---|---|---|
| EP | 3 750 487 A1 | 12/2020 |
| JP | 2003-038496 A | 2/2003 |
| JP | 2006-212453 A | 8/2006 |
| JP | 3867151 B1 | 1/2007 |
| JP | 2007505708 A | 3/2007 |
| JP | 2009534074 A | 9/2009 |
| JP | 2011139865 A | 7/2011 |
| WO | 2011/083590 A1 | 7/2011 |

OTHER PUBLICATIONS

International Search Report (PCT/ISA/210) with translation and Written Opinion (PCT/ISA/237) mailed on Jun. 16, 2020, by the Japanese Patent Office as the International Searching Authority for International Application No. PCT/JP2020/014269.

Office Action (The First Office Action) issued Mar. 15, 2023, by the National Intellectual Property Administration, P. R. China in corresponding Chinese Patent Application No. 202080016174.0 and an English translation of the Office Action. (14 pages).

The extended European Search Report issued Mar. 25, 2022, by the European Patent Office in corresponding European Patent Application No. 20776459.8-1122. (11 pages).

* cited by examiner

ADHESION PROMOTION DEVICE

CROSS-REFERENCES TO RELATED APPLICATIONS

This application is a continuation of International Application No. PCT/JP2020/014269 filed on Mar. 27, 2020, which claims priority to Japanese Patent Application No. 2019-064719 filed on Mar. 28, 2019, the entire content of both of which is incorporated herein by reference.

FIELD OF THE DISCLOSURE

The present disclosure generally relates to an adhesion promotion device.

BACKGROUND DISCUSSION

In the medical field, a medical procedure (for example, anastomosis for a digestive tract) of joining biological organs to each other by performing a surgical operation is known. In a case where the medical procedure as described above is performed, as a prognosis determinant after surgery, it is important that there is no delay in adhesion in a joint portion joined between the biological organs.

In the medical procedure of joining the biological organs, various methods and various medical instruments are used. For example, a method of suturing the biological organs by using a biodegradable suture, or a method of using a mechanical joining device (refer to Japanese Patent Application Publication No. 2007-505708 A) for suturing the biological organs by using a stapler has been proposed. In particular, in a case where anastomosis is performed by using the mechanical joining device, compared to a method of using the suture, a joining force between the biological organs can be improved in the joint portion. Accordingly, risk factors of an anastomotic leakage can be reduced.

However, a degree of progress of adhesion in the joint portion depends on a state of biological tissues in a joint object site (joint target site) of a patient. Therefore, for example, even in a case where the joining device as disclosed in Japanese Patent Application Publication No. 2007-505708 A is used, depending on the state of the biological tissues of the patient, there is a possibility that the risk factors of the anastomotic leakage cannot be sufficiently reduced.

SUMMARY

An adhesion promotion device is disclosed, which is capable of reducing risk factors of an anastomotic leakage after a surgical operation is performed.

An adhesion promotion device is disclosed, which includes a main body portion disposed between biological organs serving as a joint object. The main body portion has a sheet-shaped first region disposed between one joint target site and the other joint target site of the biological organs to promote adhesion of a biological tissue, a second region provided inward of the first region and separated from the first region in a direction intersecting with a surface direction of the first region, and an interlock portion that interlocks the first region and the second region with each other.

According to the adhesion promotion device of the present disclosure, the main body portion is pinched between the biological organs serving as the joint object. In this manner, it is possible to promote adhesion of the biological tissue of the biological organ. In addition, the second region is configured to be separated from the first region in the direction intersecting with the surface direction of the first region. Accordingly, the adhesion promotion device is disposed to cover a suture portion formed by performing purse-string suture on the biological organ. Therefore, the main body portion can be suppressed from falling out of the biological organ. According to the above-described configurations, the operator can effectively reduce risk factors of an anastomotic leakage of the biological organs.

An adhesion promotion device is disclosed that promotes adhesion between biological tissue, the adhesion promotion device comprising: a main body portion made of a biological material that promotes adhesion of a biological tissue, the main body portion includes a sheet-shaped first region disposed between one joint target site and the other joint target site of the biological organs to promote adhesion of the biological tissue, a second region provided inward of the first region and separated from the first region in a direction intersecting with a surface direction of the first region, and an interlock portion that interlocks the first region and the second region with each other; and each of the sheet-shaped first region, the second region, and the interlocking portion including a plurality of through-holes that pass through the sheet-shaped first region, the second region, and the interlocking portion, respectively.

A method is disclosed of promoting adhesion between biological tissue comprising: disposing an adhesion promotion device including a sheet-shaped main body portion that promotes the adhesion of the biological tissue between one joint target site and an other joint target site of the joint object of a biological organ; and joining the one joint target site and the other joint target site to each other in a state where at least a portion of the main body portion of the adhesion promotion device is disposed between the one joint target site and the other joint target site.

DETAILED DESCRIPTION

Figure 1:
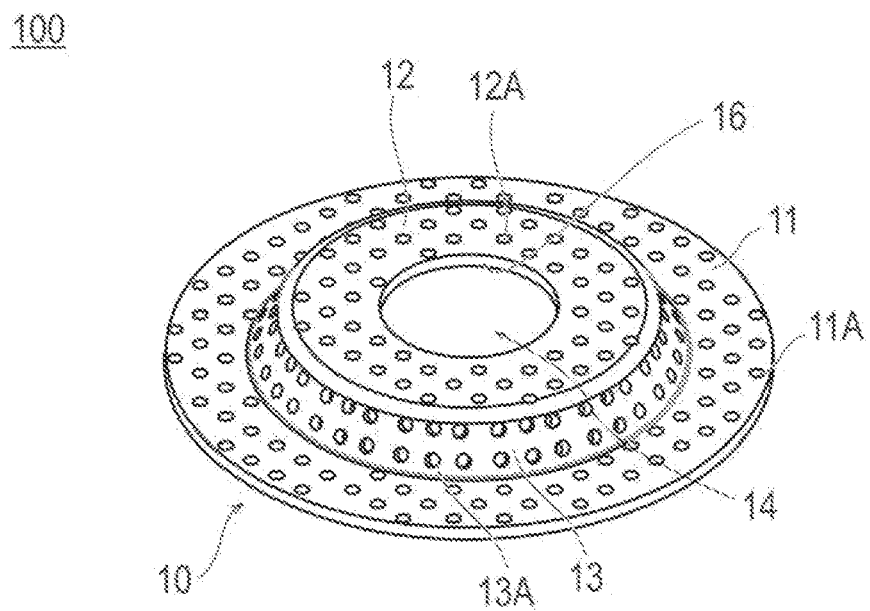
FIG. 1 is a perspective view illustrating an adhesion promotion device according to an embodiment of the present disclosure.

Set forth below with reference to the accompanying drawings is a detailed description of embodiments of an adhesion promotion device representing examples of the inventive adhesion promotion device disclosed here. In describing the drawings, the same reference numerals will be assigned to the same elements, and repeated description will be omitted. In addition, dimensional ratios in the drawings may be exaggerated for convenience of description, and may be different from actual ratios in some cases.

FIGS. 1 to 4 are views for describing a configuration of an adhesion promotion device 100 according to an embodiment of the present invention.

Adhesion Promotion Device 100

Figure 9:
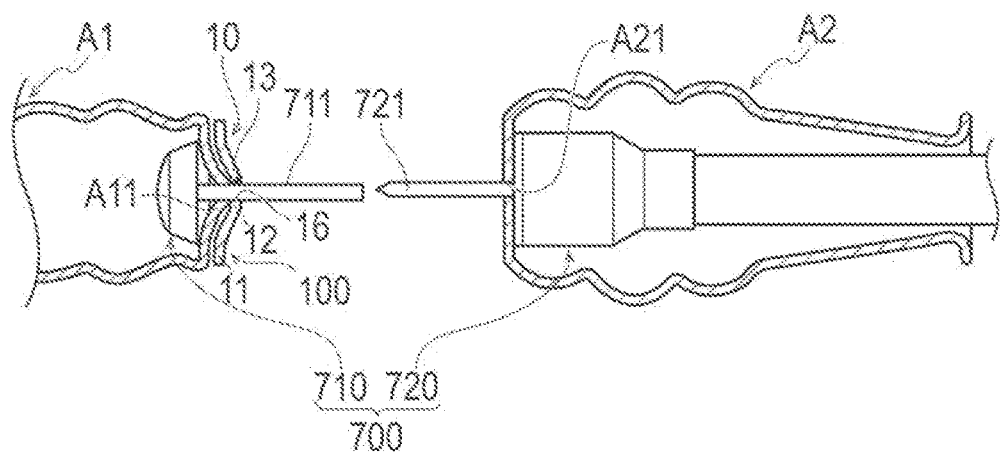
FIG. 9 is a schematic cross-sectional view for describing the large intestine anastomosis.
Figure 10:
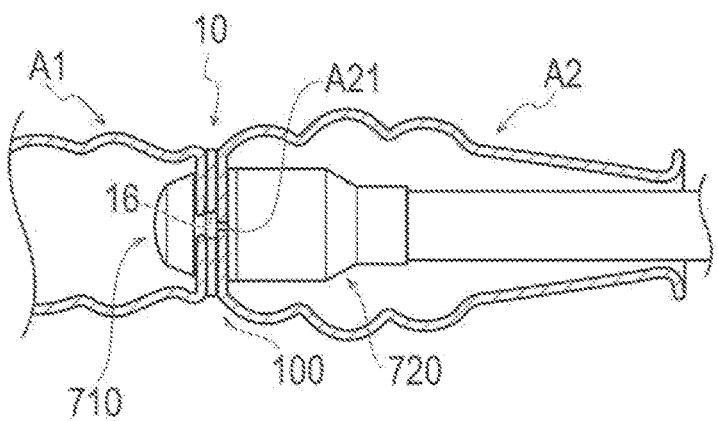
FIG. 10 is a schematic cross-sectional view for describing the large intestine anastomosis.
Figure 11:
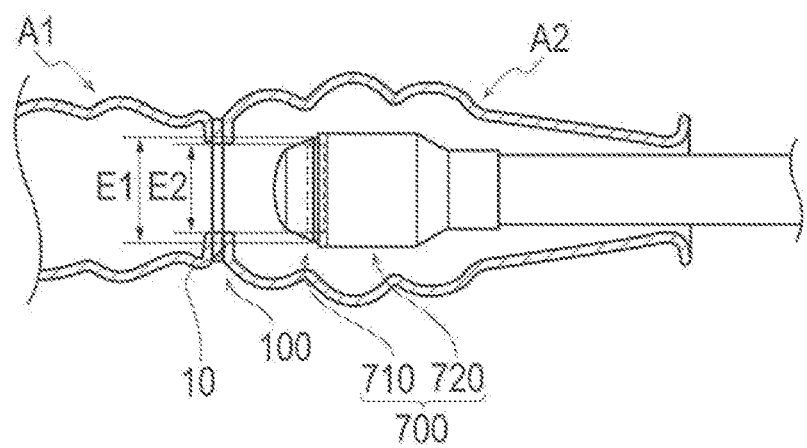
FIG. 11 is a schematic cross-sectional view for describing the large intestine anastomosis.

As illustrated in FIGS. 9 to 11, the adhesion promotion device 100 is applicable to a medical procedure (for example, anastomosis for a digestive tract) in which predetermined biological organs are joined to each other. As will be described later, in describing the present specification, the large intestine anastomosis will be described as an example of the medical procedure of using the adhesion promotion device 100.

Figure 2:
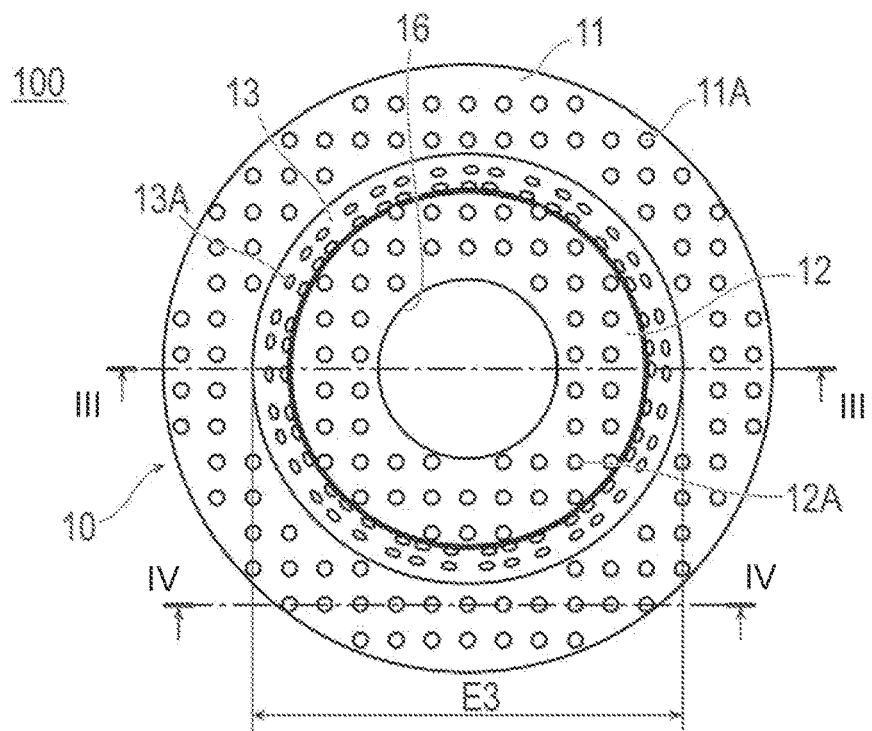
FIG. 2 is a plan view illustrating the adhesion promotion device according to the present embodiment.
Figure 3:
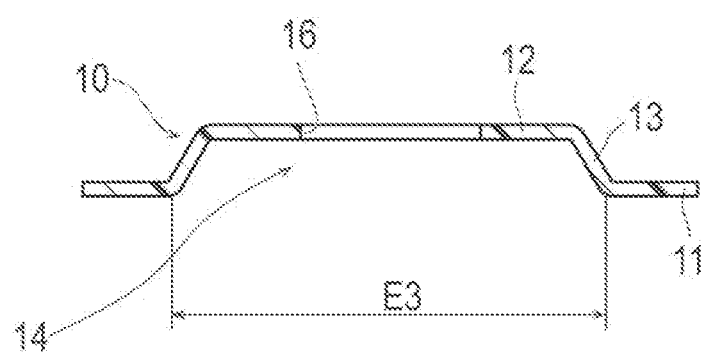
FIG. 3 is a cross-sectional view taken along line III-III in FIG. 2.

As illustrated in FIGS. 1 to 3, the adhesion promotion device 100 has a main body portion 10 disposed between the biological organs serving as a joint object.

The main body portion 10 can be formed in a sheet shape that promotes adhesion of a biological tissue. For example, the main body portion 10 can be formed of a biodegradable sheet member (thin film-shaped member). The main body portion 10 can have a substantially circular shape. However, a shape of the main body portion 10 is not particularly limited, and the shape of the main body portion 10 may be an elliptical shape or a polygonal shape (rectangular shape or triangular shape), for example.

As illustrated in FIGS. 1 to 3, the main body portion 10 has a first region 11 provided outward in a radial direction of the main body portion 10, a second region 12 provided inward of the first region 11, and an interlock portion (i.e., connection portion) 13 that interlocks (i.e., connects) the first region 11 and the second region 12 with each other. The first region 11, the second region 12, and the interlock portion 13 are configured to be integral and continuous with each other.

The first region 11 is formed in a substantially circular shape when viewed from above. A plurality of through-holes 11A are formed in the first region 11.

As will be described later, the first region 11 is joined to the biological tissue by a joining device 700 including a first engagement instrument 710 disposed in one joint target site of the biological organ, and a second engagement instrument 720 disposed in the other joint target site of the biological organs and facing the first engagement instrument 710 (refer to FIGS. 9 to 11).

The second region 12 is formed in a substantially circular shape when viewed from above. A plurality of through-holes 12A are formed in the second region 12.

As illustrated in FIGS. 1 to 3, a hole portion 16 is formed in the vicinity of the center of the second region 12. The hole portion 16 may be formed in advance in the main body portion 10, or may be prepared by an operator while a medical procedure is performed.

As illustrated in FIG. 3, the second region 12 is configured to be separated from the first region 11 in a direction intersecting with a surface direction of the first region 11 (upward direction in FIG. 3).

The interlock portion 13 can be formed in a substantially circular shape when viewed from above. A plurality of through-holes 13A are formed in the interlock portion 13.

As illustrated in FIG. 3, the interlock portion 13 can have a cross-sectional shape which is narrowed from the first region 11 side to the second region 12 side. The interlock portion 13 can be formed in a tapered shape in this way. Accordingly, in a step illustrated in FIG. 10 (to be described later), the first region 11, the second region 12, and the interlock portion 13 can be preferably brought into contact with the biological organ (mouth side A1 of a large intestine).

The main body portion 10 is configured in this way. Accordingly, an accommodation portion 14 is formed below the second region 12 and the interlock portion 13. The accommodation portion 14 accommodates a suture portion A11 formed by performing purse-string suture on the biological organ.

In accordance with an exemplary embodiment, a size E3 of the accommodation portion 14 (corresponding to a length along the surface direction of the second region 12 and the interlock portion 13, refer to FIG. 3) is located inward of a region E1 where the first engagement instrument 710 and the second engagement instrument 720 of the joining device 700 illustrated in FIG. 11 face and overlap each other across the main body portion 10.

The accommodation portion 14 is configured in this way. Accordingly, when the adhesion promotion device 100 is punched, the second region 12 and the interlock portion 13 can be punched by the joining device 700, and only the first regions 11 of the main body portion 10 is disposed between the pair of biological organs. Therefore, the pair of biological organs can be joined to each other.

As illustrated in FIGS. 1 to 2, the plurality of through-holes 11A, 12A, and 13A are regularly (i.e., set spacing between each of the plurality of through-holes) and periodically provided in the surface direction. However, the plurality of through-holes 11A, 12A, and 13A may be randomly provided in the surface direction.

In accordance with an exemplary embodiment, the plurality of through-holes 11A, 12A, and 13A have substantially the same shape as each other. Therefore, a configuration of the through-hole 11A will be described herein as a representative with reference to FIG. 4.

Figure 4:
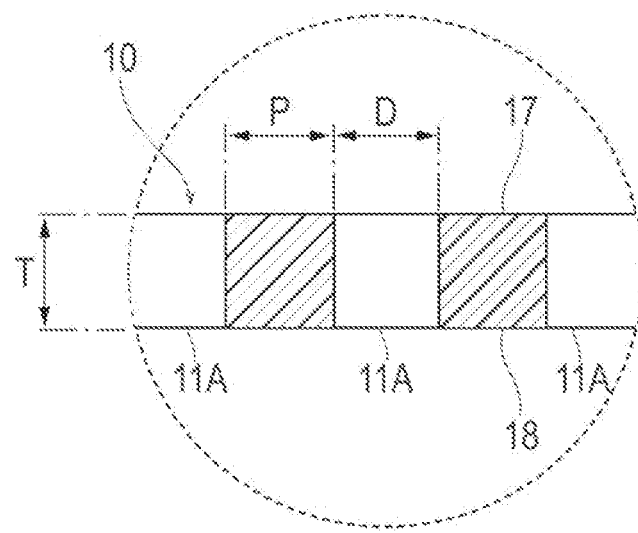
FIG. 4 is an enlarged cross-sectional view illustrating a portion of a cross section taken along line IV-IV in FIG. 2.

As illustrated in FIG. 4, the through-hole 11A extends substantially perpendicularly between the front surface 17 and the rear surface 18 along the thickness direction (upward-downward direction in FIG. 4) of the main body portion 10. The through-hole 11A may be bent or curved in a zigzag manner between the front surface 17 and the rear surface 18, in a cross section taken along the thickness direction of the main body portion 10.

In accordance with an exemplary embodiment, the through-hole 11A has a substantially circular planar shape (shape when the first region 11 of the main body portion 10 is viewed in a plan view). However, a shape of the through-hole 11A is not particularly limited, and may be an elliptical shape or a polygonal shape (rectangular shape or triangular shape), for example. In addition, each of the through-holes 11A, 12A, and 13A may have a different planar shape or cross-sectional shape.

A thickness T (refer to FIG. 4) of the main body portion 10 (first region 11, second region 12, and interlock portion 13) is not particularly limited. However, the thickness T of the main body portion 10 can be, for example, 0.05 mm to 0.3 mm, and is preferably 0.1 mm to 0.2 mm. In a case where the thickness of the main body portion 10 is 0.05 mm or larger (for example, in a case where the thickness is 0.1 mm or larger), the main body portion 10 can be provided with strength to such an extent that the main body portion 10 is not damaged when the adhesion promotion device 100 is handled. On the other hand, in a case where the thickness of the main body portion 10 is 0.3 mm or smaller (for example, when the thickness is 0.2 mm or smaller), the main body portion 10 can be provided with sufficient flexibility to follow the biological tissue after the main body portion 10 closely adheres to the biological tissue to which the main body portion 10 is applied.

In accordance with an exemplary embodiment, the main body portion 10 can have a ratio value of hole diameter D (distance D illustrated in FIG. 4) of the through-hole 11A with respect to a pitch P (distance P illustrated in FIG. 4 and a distance between the through-holes 11A adjacent to each other) of the through-holes 11A is 0.25 or greater and smaller than 40. In a case where the planar shape of the through-hole 11A is a perfect circle, the hole diameter D of the through-hole 11A is equal to a diameter of the perfect circle. On the other hand, in a case where the planar shape of the through-hole 11A is not the perfect circle, the diameter of the perfect circle (diameter corresponding to a circle) having an area the same as an area of an opening portion (portion facing the front surface 17 or the rear surface 18 in the through-hole 11A) of the through-hole 11A can be defined as the hole diameter D of the through-hole 11A.

The main body portion 10 has the plurality of through-holes 11A, 12A, and 13A. Accordingly, a plurality of values exist for the hole diameter D corresponding to each of the through-holes 11A, 12A, and 13A. Therefore, in the present embodiment, in calculating the above-described ratio value, an arithmetic mean value of two or more values of the hole diameter D corresponding to each of the plurality of the through-hole 11A, 12A, and 13A is used as a representative value of the hole diameter D. The pitch P of the plurality of through-holes 11A, 12A, and 13A is defined by a shortest distance between the opening portions of two of the through-holes 11A, 12A, and 13A. However, with regard to the value of the pitch P, a plurality of values exist in the pitch P corresponding to a combination of the through-holes 11A, 12A, and 13A adjacent to each other. Therefore, in the present embodiment, in calculating the above-described ratio value, the arithmetic mean value of two or more values of the pitch P corresponding to each combination of the through-holes 11A, 12A, and 13A adjacent to each other is used as the representative value of the pitch P.

The pitch P, the hole diameter D, and the ratio of the hole diameter D with respect to the pitch P of the through-holes 11A, 12A, and 13A are examples, and the configuration is not limited to the pitch P, the hole diameter D, and the ratio of the hole diameter D with respect to the pitch P of the through-holes 11A, 12A, and 13A as disclosed The main body portion 10 can be formed of a biodegradable material. The material of the main body portion 10 is not particularly limited, and can include a biodegradable resin, for example. For example, the biodegradable resin of the main body portion 10 can be a degradable (co)polymers disclosed in Japanese Patent Application Publication No. 2011-528275 A, Japanese Patent Application Publication No. 2008-514719 A, Pamphlet of International Publication No. 2008-1952 (i.e., WO 2008/001952), or Japanese Patent Application Publication No. 2004-509205 A. Specifically, for example, the biodegradable resin includes (1) a polymer selected from a group consisting of aliphatic polyester, polyester, polyacid anhydride, polyorthoester, polycarbonate, polyphosphazene, polyphosphate ester, polyvinyl alcohol, polypeptide, polysaccharide, protein, and cellulose, and (2) a copolymer formed of one or more monomers forming (1) described above. That is, it is preferable that the biodegradable sheet includes at least one type of the biodegradable resin selected from the group consisting of the polymer selected from the group consisting of aliphatic polyester, polyester, polyacid anhydride, polyorthoester, polycarbonate, polyphosphazene, polyphosphate ester, polyvinyl alcohol, polypeptide, polysaccharide, protein, and cellulose, and the copolymer formed of one or more monomers forming the polymer.

A method for manufacturing the main body portion 10 is not particularly limited. For example, the following method for manufacturing the main body portion 10 may be adopted. A fiber formed of the above-described biodegradable resin is prepared, and a mesh-shaped sheet is manufactured by using the fiber. The sheet is shaped to form the first region 11, the second region 12, and the interlock portion 13. The method for preparing the fiber formed of the biodegradable resin is not particularly limited. For example, the method for preparing the fiber can include an electrospinning method (electrospinning method and electrostatic spinning method) and a melt blow method. For the main body portion 10, only one of the above-described methods may be selected and used, or two or more of the above-described methods may be selected and appropriately combined with each other. As another example of the method for manufacturing the main body portion 10, the biodegradable sheet according to the present disclosure may be manufactured by spinning the fiber formed of the above-described biodegradable resin in accordance with a usual method in the related art and knitting the obtained fiber into a mesh shape.

The main body portion 10 induces a biological reaction by a forming material such as the biodegradable resin forming the main body portion 10. The main body portion 10 induces expression of a biological component such as fibrin by the biological reaction. The biological component induced in this way can help promote the adhesion by being accumulated to penetrate the through-holes 11A, 12A, and 13A of the main body portion 10. Therefore, the main body portion 10 is disposed between the biological organs serving as the joint object. In this manner, the adhesion is promoted by the above-described mechanism.

A material of the main body portion 10 may not be biodegradable as long as the adhesion of the biological organ can be promoted. In addition, the main body portion 10 may not have the through-holes 11A, 12A, and 13A regardless of the material, as long as the adhesion of the biological organ can be promoted.

As described above, the adhesion promotion device 100 according to the present embodiment has the main body portion 10 disposed between the biological organs serving as the joint object. The main body portion 10 has the sheet-shaped first region 11 disposed between one joint target site and the other joint target site of the biological organs to promote the adhesion of the biological tissue, the second region 12 disposed inward of the first region 11 and separated from the first region 11 in the direction intersecting with the surface direction of the first region 11, and the interlock portion 13 that interlocks the first region 11 and the second region 12 with each other. According to the adhesion promotion device 100 configured in this way, the adhesion of the biological tissue of the biological organ can be promoted by pinching the main body portion 10 between the biological organs serving as the joint object. In addition, the second region 12 is configured to be separated from the first region 11 in the direction intersecting with the surface direction of the first region 11. Accordingly, the adhesion promotion device 100 is disposed to cover the suture portion A11 formed by performing purse-string suture on the biological organ. Therefore, the main body portion 10 can be suppressed from falling out of the biological organ. According to the above-described configurations, the operator can effectively reduce risk factors of an anastomotic leakage of the biological organ. Furthermore, the adhesion promotion device 100 can be prevented from unintentionally interfering with the mouth side A1 of the large intestine. Accordingly, the adhesion promotion device 100 can be preferably disposed on the mouth side A1 of the large intestine.

In addition, the interlock portion 13 has the cross-sectional shape which is narrowed from the first region 11 side toward the second region 12 side. According to the adhesion promotion device 100 configured in this way, as described above, the first region 11, the second region 12, and the interlock portion 13 can be preferably brought into contact with the biological organ.

In addition, the first region 11 is joined to the biological tissue by the joining device 700 including the first engagement instrument 710 disposed in one joint target site of the biological organ, and the second engagement instrument 720 disposed in the other joint target site of the biological organs and facing the first engagement instrument 710. The interlock portion 13 and the second region 12 are located inward of the region where the first engagement instrument 710 and the second engagement instrument 720 face and overlap each other across the main body portion 10 when the main body portion 10 is joined to the biological tissue by the first engagement instrument 710 and the second engagement instrument 720. According to the adhesion promotion device 100 configured in this way, the joining device 700 can reliably punch the second region 12 and the interlock portion 13 when the adhesion promotion device 100 is punched. Only the first region 11 of the main body portion 10 is disposed between the pair of biological organs. Therefore, the pair of biological organs can be preferably joined to each other.

In addition, when the main body portion 10 is joined to the biological tissue by the first engagement instrument 710 and the second engagement instrument 720, the outer edge of the first region 11 is located outward of the region where the first engagement instrument 710 and the second engagement instrument 720 face and overlap each other across the main body portion 10. According to the adhesion promotion device 100 configured in this way, when the adhesion promotion device 100 is punched, the joining device 700 can reliably dispose the first region 11 between the pair of biological organs.

Hitherto, the adhesion promotion device 100 has been described with reference to the embodiment. However, the present disclosure is not limited to the description of the above-described embodiment, and various modifications can be made within the scope not departing from the concept. Hereinafter, modification examples of the adhesion promotion device will be described. In describing the modification examples, configurations and contents which are described above in the adhesion promotion device 100 according to the above-described embodiment will be appropriately omitted in the description.

Modification Example 1

Figure 5:
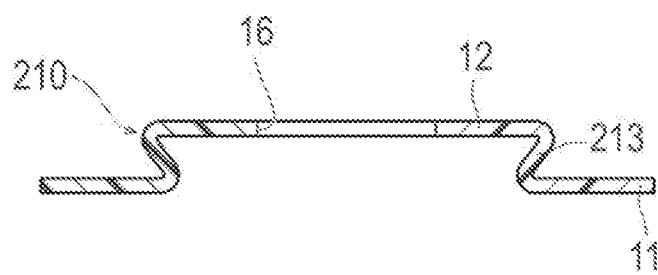
FIG. 5 is a view corresponding to FIG. 3 of an adhesion promotion device according to Modification Example 1.

A configuration of an adhesion promotion device 200 according to Modification Example 1 will be described with reference to FIG. 5. FIG. 5 is a view corresponding to FIG. 3 of the adhesion promotion device 200 according to Modification Example 1.

As illustrated in FIG. 5, the adhesion promotion device 200 according to Modification Example 1 has a main body portion 210 disposed between the biological organs serving as the joint object.

As illustrated in FIG. 5, the main body portion 210 has the first region 11 provided outward in the radial direction of the main body portion 210, the second region 12 provided inward of the first region 11, and an interlock portion 213 that interlocks the first region 11 and the second region 12 with each other. The first region 11 and the second region 12 have configurations the same as those of the first region 11 and the second region 12 of the adhesion promotion device 100 according to the above-described embodiment, and thus, description of the first region 11 and the second region 12 will be omitted.

As illustrated in FIG. 5, the interlock portion 213 has a cross-sectional shape which is widened from the first region 11 side toward the second region 12 side. The interlock portion 213 is formed in a tapered shape in this way. Accordingly, in a step illustrated in FIG. 10, the first region 11, the second region 12, and the interlock portion 13 can be preferably brought into contact with the biological organ.

Modification Example 2

Figure 6:
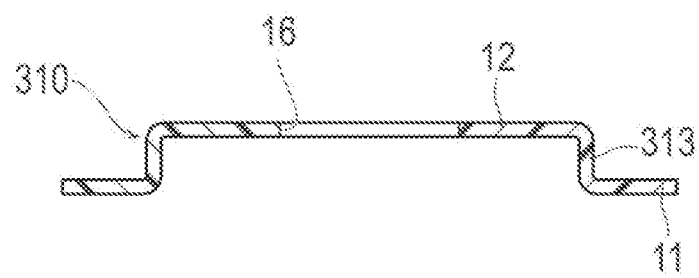
FIG. 6 is a view corresponding to FIG. 3 of an adhesion promotion device according to Modification Example 2.

Next, a configuration of an adhesion promotion device 300 according to Modification Example 2 will be described with reference to FIG. 6. FIG. 6 is a view corresponding to FIG. 3 of the adhesion promotion device 300 according to Modification Example 2.

As illustrated in FIG. 6, the adhesion promotion device 300 according to Modification Example 2 has a main body portion 310 disposed between the biological organs serving as the joint object.

As illustrated in FIG. 6, the main body portion 310 has the first region 11 provided outward in the radial direction of the main body portion 310, the second region 12 provided inward of the first region 11, and an interlock portion 313 that interlocks the first region 11 and the second region 12 with each other. The first region 11 and the second region 12 have configurations the same as those of the first region 11 and the second region 12 of the adhesion promotion device 100 according to the above-described embodiment, and thus, description of the first region 11 and the second region 12 will be omitted.

As illustrated in FIG. 6, the interlock portion 313 has a cross-sectional shape orthogonal to the surface direction of the first region 11. According to the adhesion promotion device 300 configured in this way, the second region 12 is configured to be separated from the first region 11 in the direction intersecting with the surface direction of the first region 11. Accordingly, the adhesion promotion device 300 is configured to cover the suture portion A11 formed by performing purse-string suture on the biological organ. Therefore, the main body portion 10 can be suppressed from falling out of the biological organ.

Embodiment of Treatment Method (Biological Organ Anastomosis)

Next, a treatment method of using the adhesion promotion device will be described.

Figure 7:
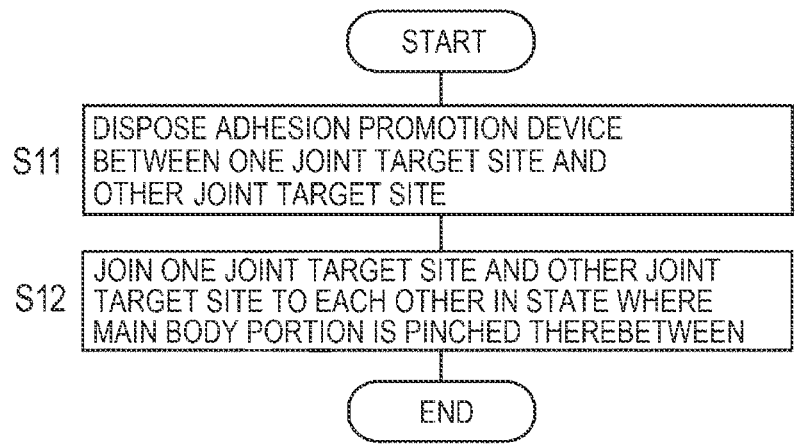
FIG. 7 is a flowchart illustrating each procedure of a treatment method of using the adhesion promotion device.

FIG. 7 is a flowchart illustrating each procedure of the treatment method of using the adhesion promotion device.

The treatment method includes disposing the adhesion promotion device including the sheet-shaped main body portion that promotes the adhesion of the biological tissue between one joint target site and the other joint target site of the joint object of the biological organ (S11), and joining one joint target site and the other joint target site to each other in a state where at least a portion of the main body portion of the adhesion promotion device is disposed between one joint target site and the other joint target site (S12).

The biological organs joined by using the treatment method and the joint target site in the biological organs are not particularly limited, and can be selected in any desired manner. However, in the following description, large intestine anastomosis will be described as an example. In addition, as the adhesion promotion device used in each medical procedure described below, for example, any desired device can be selected from the above-described adhesion promotion devices. However, in the following description, as a representative example that can be suitably used for each medical procedure, an application example of the adhesion promotion device 100 according to the embodiment illustrated in FIG. 1 will be described. In addition, in each medical procedure described below, detailed description of a medical procedure or a joining device will be appropriately omitted.

Hereinafter, in the description in the present specification, "disposing the adhesion promotion device between the biological organs" means at least any one of disposing the adhesion promotion device in a state of being in direct or indirect contact with the biological organs, disposing the adhesion promotion device in a state where a spatial gap is formed between the adhesion promotion device and the biological organs, and disposing the adhesion promotion device in both the states (for example, disposing the adhesion promotion device in a state where the adhesion promotion device is in contact with one biological organ and the adhesion promotion device is not in contact with the other biological organ). In addition, in the description in the present specification, a "periphery" does not define a strict range (region), and means a predetermined range (region) as long as a treatment purpose (joining the biological organs to each other) can be achieved. In addition, as long as the treatment purpose can be achieved, in the medical procedure described in each treatment method, orders can be appropriately switched among the medical procedures. In addition, in the description in the present specification, "moving the portions to be relatively closer to each other" means both moving two or more objects to be closer to each other, and moving only one to be closer to the other one.

Embodiment of Treatment Method (Large Intestine Anastomosis)

Figure 8:
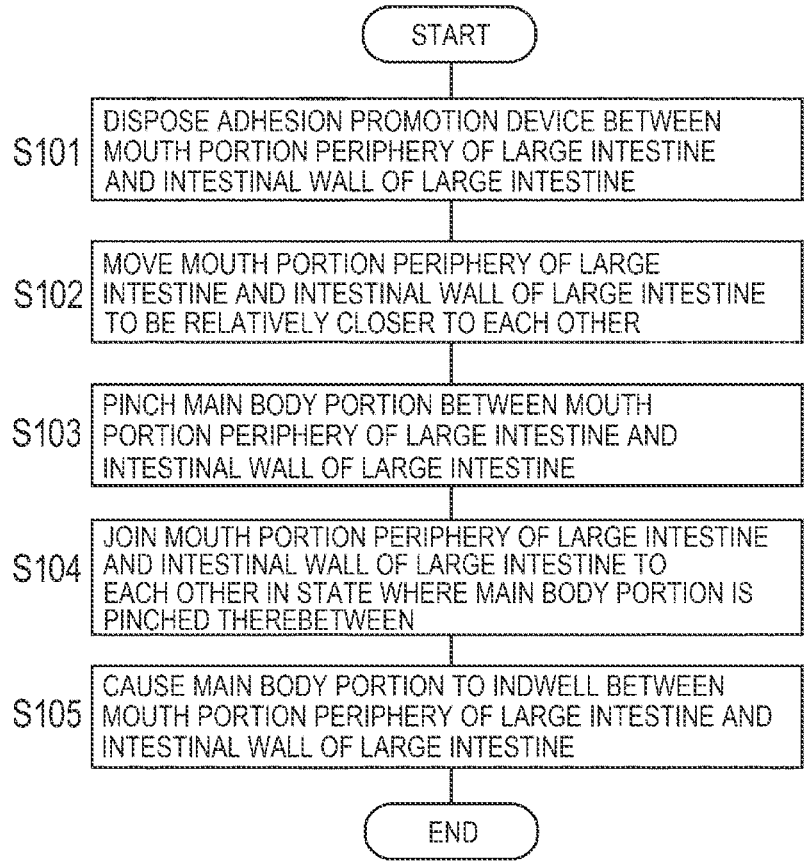
FIG. 8 is a flowchart illustrating a procedure of an embodiment (large intestine anastomosis) of the treatment method.

FIG. 8 is a flowchart illustrating a procedure of an embodiment of the treatment method (large intestine anastomosis), and FIGS. 9 to 11 are views for describing the large intestine anastomosis.

In the treatment method according to the present embodiment, the biological organ serving as the joint object is a large intestine cut due to excision of a cancer tumor. Specifically, the biological organs serving as the joint object are a mouth side A1 of the cut large intestine and an anal side A2 of the cut large intestine. In the following description, a procedure will be described in which a mouth portion periphery (one joint target site) on the mouth side A1 of the cut large intestine and a portion (other joint target site) of an intestinal wall on the anal side A2 of the cut large intestine are joined to each other.

As illustrated in FIG. 8, the treatment method according to the present embodiment includes disposing the adhesion promotion device 100 between the mouth portion periphery of the large intestine and the intestinal wall of the large intestine (S101), moving the mouth portion periphery of the large intestine and the intestinal wall of the large intestine to be relatively closer to each other (S102), pinching the main body portion 10 of the adhesion promotion device 100 between the mouth portion periphery of the large intestine and the intestinal wall of the large intestine (S103), joining the mouth portion periphery of the large intestine and the intestinal wall of the large intestine to each other in a state where the main body portion 10 of the adhesion promotion device 100 is pinched between the mouth portion periphery of the large intestine and the intestinal wall of the large intestine (S104), and causing the main body portion 10 of the adhesion promotion device 100 to indwell between the mouth portion periphery of the large intestine and the intestinal wall of the large intestine (S105).

Next, the treatment method according to the present embodiment will be described in detail with reference to FIGS. 9 to 11.

As illustrated in FIG. 9, the operator inserts the first engagement instrument 710 of the joining device 700 into the mouth side A1 of the large intestine. In addition, the operator disposes the second engagement instrument 720 of the joining device 700 on the anal side A2 of the large intestine. Before the second engagement instrument 720 is disposed on the anal side A2 of the large intestine, the operator forms a through-hole A21 for inserting the second engagement instrument 720 of the joining device 700 into the anal side A2 of the large intestine. A timing at which the through-hole A21 is formed is not particularly limited as long as the timing is before the second engagement instrument 720 is disposed.

For example, as the joining device 700, a device used for the large intestine anastomosis can be used. For example, the first engagement instrument 710 and the second engagement instrument 720 which configure the joining device 700 include anvils and trocars. As the first engagement instrument 710 and the second engagement instrument 720 engage with each other, the joining device 700 excises the biological tissue disposed between the first engagement instrument 710 and the second engagement instrument 720, and sutures a periphery of the excised biological tissue into a circumferential shape by using a stapler. For example, the first engagement instrument 710 is an instrument including a cylindrical engagement target portion 711. For example, the second engagement instrument 720 is an instrument including an engagement pin 721 to engage with and to be inserted into the engagement target portion 711 of the first engagement instrument 710.

As illustrated in FIG. 9, the operator inserts the engagement target portion 711 of the first engagement instrument 710 into the mouth side A1 of the large intestine, and performs purse-string suture in a projecting state of the engagement target portion 711, thereby forming the suture portion A11. An outer surface of the suture portion A11 has a shape partially projecting to a projection side due to the suture.

Next, as illustrated in FIG. 9, the operator disposes the adhesion promotion device 100 between the mouth side A1 of the large intestine and the anal side A2 of the large intestine. In this case, the adhesion promotion device 100 is configured to include the first region 11, the second region 12, and the interlock portion 13. Accordingly, the adhesion promotion device 100 is disposed to cover the suture portion A11 partially projecting due to the suture. Then, the operator causes the engagement target portion 711 included in the first engagement instrument 710 to pass through the hole portion 16 of the main body portion 10. Therefore, the adhesion promotion device 100 can be prevented from falling out from the mouth side A1 of the large intestine while the operator performs the medical procedure. Furthermore, the adhesion promotion device 100 can be prevented from unintentionally interfering with the mouth side A1 of the large intestine. Accordingly, the adhesion promotion device 100 can be preferably disposed on the mouth side A1 of the large intestine.

Next, as illustrated in FIG. 10, the operator engages the first engagement instrument 710 and the second engagement instrument 720 with each other by moving both of these to be relatively closer to each other. The operator pinches the mouth portion periphery on the mouth side A1 of the large intestine, the main body portion 10 of the adhesion promotion device 100, and the periphery of the through-hole A21 formed on the intestinal wall on the anal side A2 of the large intestine, between the first engagement instrument 710 and the second engagement instrument 720. The operator causes the joining device 700 to excise a portion on the mouth side A1 of the large intestine, a portion of the main body portion 10 of the adhesion promotion device 100, and a portion on the anal side A2 of the large intestine pinched between the first engagement instrument 710 and the second engagement instrument 720. In addition, at the same time, the operator operates the joining device 700 to join the peripheries of the excised site by using a stapler.

Next, as illustrated in FIG. 11, the operator removes the joining device 700 outward of the living body from the anal side A2 of the large intestine via an anus, for example. Here, in the medical procedure, the joining device 700 punches each configuration member pinched by the joining device 700 by using a punching blade incorporated in the first engagement instrument 710 or the second engagement instrument 720. Therefore, the region E2 where the biological organ joined by the joining device 700 is punched is located inward of the region E1 where the first engagement instrument 710 and the second engagement instrument 720 face and overlap each other across the main body portion 10.

According to this treatment method, a simple method of pinching the sheet-shaped main body portion included in the adhesion promotion device between one joint target site and the other joint target site is used. In this manner, it is possible to reduce the risk factors of the anastomotic leakage after a medical procedure for joining (for example, anastomosis for a digestive tract).

The detailed description above describes versions of an adhesion promotion device representing examples of the inventive medical device disclosed here. The invention is not limited, however, to the precise embodiment and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method of promoting adhesion between biological tissue comprising:
    disposing an adhesion promotion device including a sheet-shaped main body portion that promotes the adhesion of the biological tissue on one joint target site of a biological organ, the main body portion including a sheet-shaped first region disposed between the one joint target site and an other joint target site of the biological organ to promote adhesion of the biological tissue, a second region provided inward of the first region and separated from the first region in a direction intersecting with a surface direction of the first region, and an interlock portion that interlocks the first region and the second region with each other, the second region and the interlock portion forming an accommodation portion;
    accommodating a suture portion formed by performing purse-string suture on the biological organ into the accommodation portion;
    moving the one joint target site and the other joint target site to be relatively closer to each other;
    punching the second region and the interlock portion with a joining device;
    joining the one joint target site and the other joint target site to each other in a state where opposing surfaces of at least a portion of the main body portion of the adhesion promotion device are disposed between and in contact with the one joint target site and the other joint target site; and
    causing only the first region of the main body portion of the adhesion promotion device to indwell between the one joint target site and the other joint target site.

2. The method according to claim 1, further comprising:
    disposing the adhesion promotion device between a mouth portion periphery of a large intestine and an intestinal wall of the large intestine;
    moving the mouth portion periphery of the large intestine and the intestinal wall of the large intestine to be relatively closer to each other;
    placing the main body portion of the adhesion promotion device between the mouth portion periphery of the large intestine and the intestinal wall of the large intestine;
    joining the mouth portion periphery of the large intestine and the intestinal wall of the large intestine to each other in a state where the main body portion of the adhesion promotion device is placed between the mouth portion periphery of the large intestine and the intestinal wall of the large intestine; and
    causing the main body portion of the adhesion promotion device to indwell between the mouth portion periphery of the large intestine and the intestinal wall of the large intestine.

3. The method according to claim 1, wherein the interlock portion has a cross-sectional shape which is narrowed from a side of the first region toward a side of the second region.

4. The method according to claim 1, wherein the interlock portion has a cross-sectional shape orthogonal to the surface direction of the first region.

5. The method according to claim 1, wherein the interlock portion has a cross-sectional shape which is widened from a side of the first region toward a side of the second region.

6. The method according to claim 1, further comprising:
    joining the first region to the biological tissue with the joining device, the joining device including a first engagement instrument disposed in the one joint target site of the biological organ; and
    disposing a second engagement instrument of the joining device in the other joint target site of the biological organ and facing the first engagement instrument.

7. The method according to claim 6, further comprising:
    joining the main body portion to the biological tissue with the first engagement instrument and the second engagement instrument, the interlock portion and the second region are located inward of a region where the first engagement instrument and the second engagement instrument face and overlap each other across the main body portion.

8. The method according to claim 6, further comprising:
when the main body portion is joined to the biological tissue by the first engagement instrument and the second engagement instrument, locating an outer edge of the first region outward of a region where the first engagement instrument and the second engagement instrument face and overlap each other across the main body portion.

9. The method according to claim 1, wherein the first region has a plurality of through-holes that pass through the first region.

10. The method according to claim 1, wherein the second region has a plurality of through-holes that pass through the second region.

11. The method according to claim 1, wherein the interlock portion has a plurality of through-holes that pass through the interlock portion.

12. The method according to claim 1, further comprising:
disposing only opposing surfaces of the first region of the main body portion between and in contact with the one joint target site and the other joint target site of the biological organ with the punching of the second region and the interlock portion with the joining device.

13. The method according to claim 6, wherein one of the first engagement instrument or the second engagement instrument includes a punching blade incorporated therein, and the method further comprises:
creating a hole in the main body portion of the adhesion promotion device with the first engagement instrument and the second engagement instrument.

14. A method of promoting adhesion between biological tissue comprising:
disposing an adhesion promotion device including a sheet-shaped main body portion that promotes the adhesion of the biological tissue on a mouth portion periphery of a large intestine, the main body portion including a sheet-shaped first region disposed between the mouth portion periphery of the large intestine and an intestinal wall of the large intestine to promote adhesion of the biological tissue, a second region provided inward of the first region and separated from the first region in a direction intersecting with a surface direction of the first region, and an interlock portion that interlocks the first region and the second region with each other, the second region and the interlock portion forming an accommodation portion;
accommodating a suture portion formed by performing purse-string suture on the large intestine into the accommodation portion;
moving the mouth portion periphery of the large intestine and the intestinal wall of the large intestine to be relatively closer to each other;
punching the second region and the interlock portion with a joining device and creating a hole in the main body portion of the adhesion promotion device;
joining the mouth portion periphery of the large intestine and the intestinal wall of the large intestine to each other in a state where at least a portion of the main body portion of the adhesion promotion device is disposed between the mouth portion periphery of the large intestine and the intestinal wall of the large intestine; and
causing only the first region of the main body portion of the adhesion promotion device to indwell between the mouth portion periphery of the large intestine and the intestinal wall of the large intestine.

15. The method according to claim 14, wherein the joining device includes a first engagement instrument and a second engagement instrument, and one of the first engagement instrument or the second engagement instrument includes a punching blade incorporated therein.

16. The method according to claim 14, wherein the joining of the mouth portion periphery of the large intestine and the intestinal wall of the large intestine to each other comprises opposing surfaces of at least a portion of the main body portion of the adhesion promotion device being disposed between and in contact with the mouth portion periphery of the large intestine and the intestinal wall of the large intestine.

17. The method according to claim 14, wherein the interlock portion has a cross-sectional shape which is narrowed from a side of the first region toward a side of the second region.

18. The method according to claim 14, wherein the interlock portion has a cross-sectional shape orthogonal to the surface direction of the first region.

* * * * *